Sept. 20, 1955     L. J. MATHSON     2,718,154
TRANSMISSION
Filed May 4, 1953            4 Sheets-Sheet 1
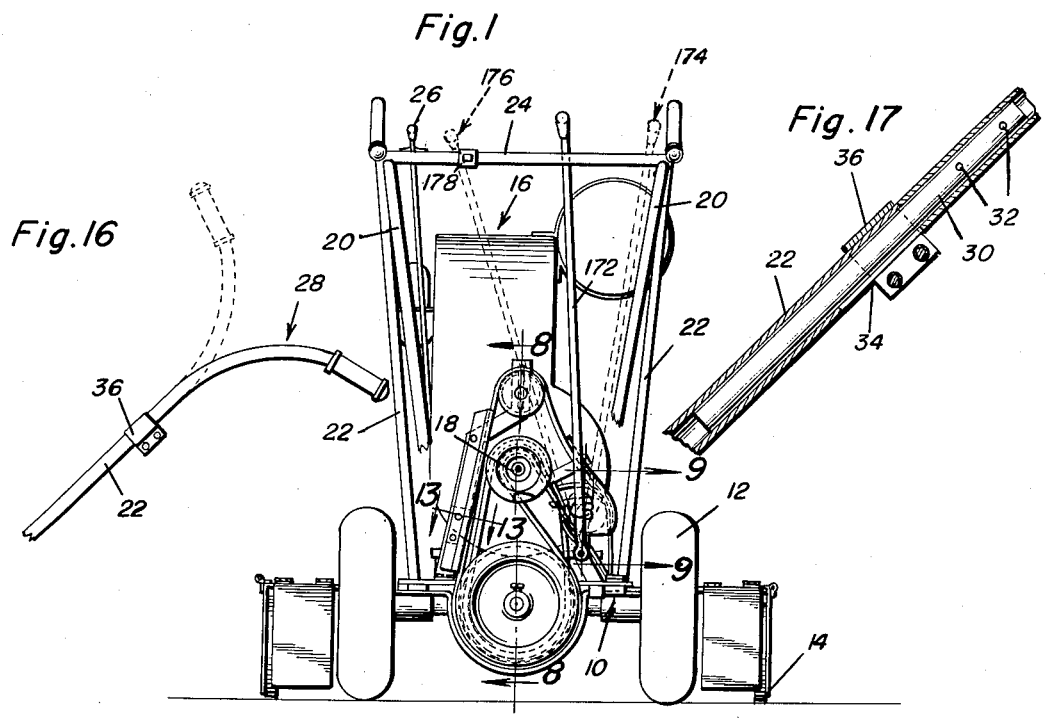
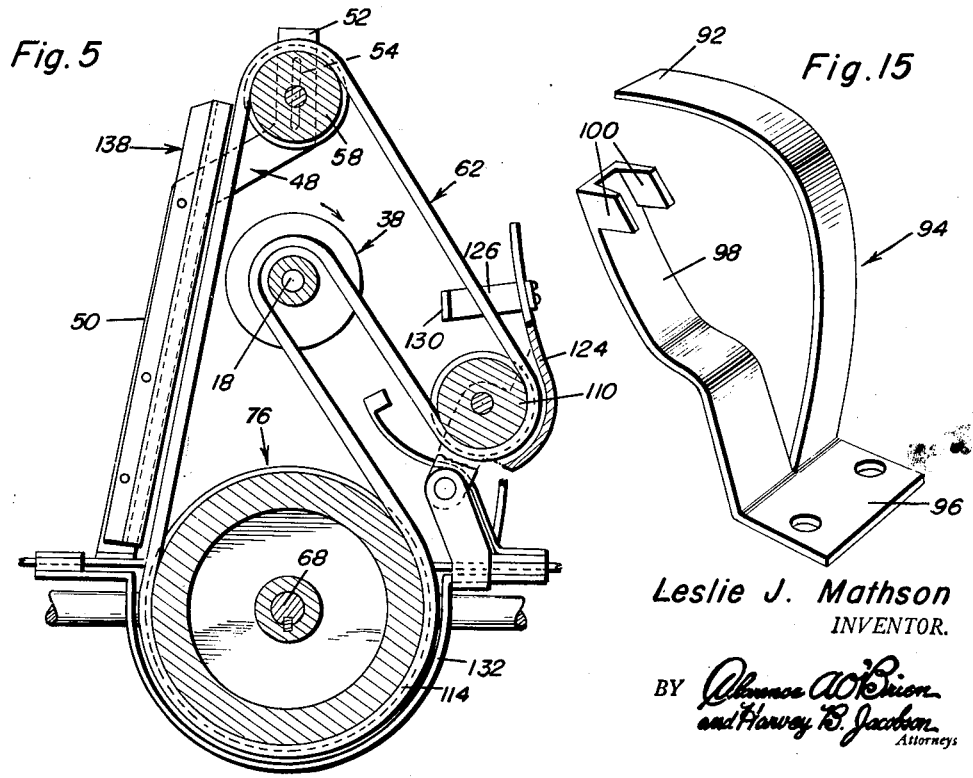
Leslie J. Mathson
INVENTOR.

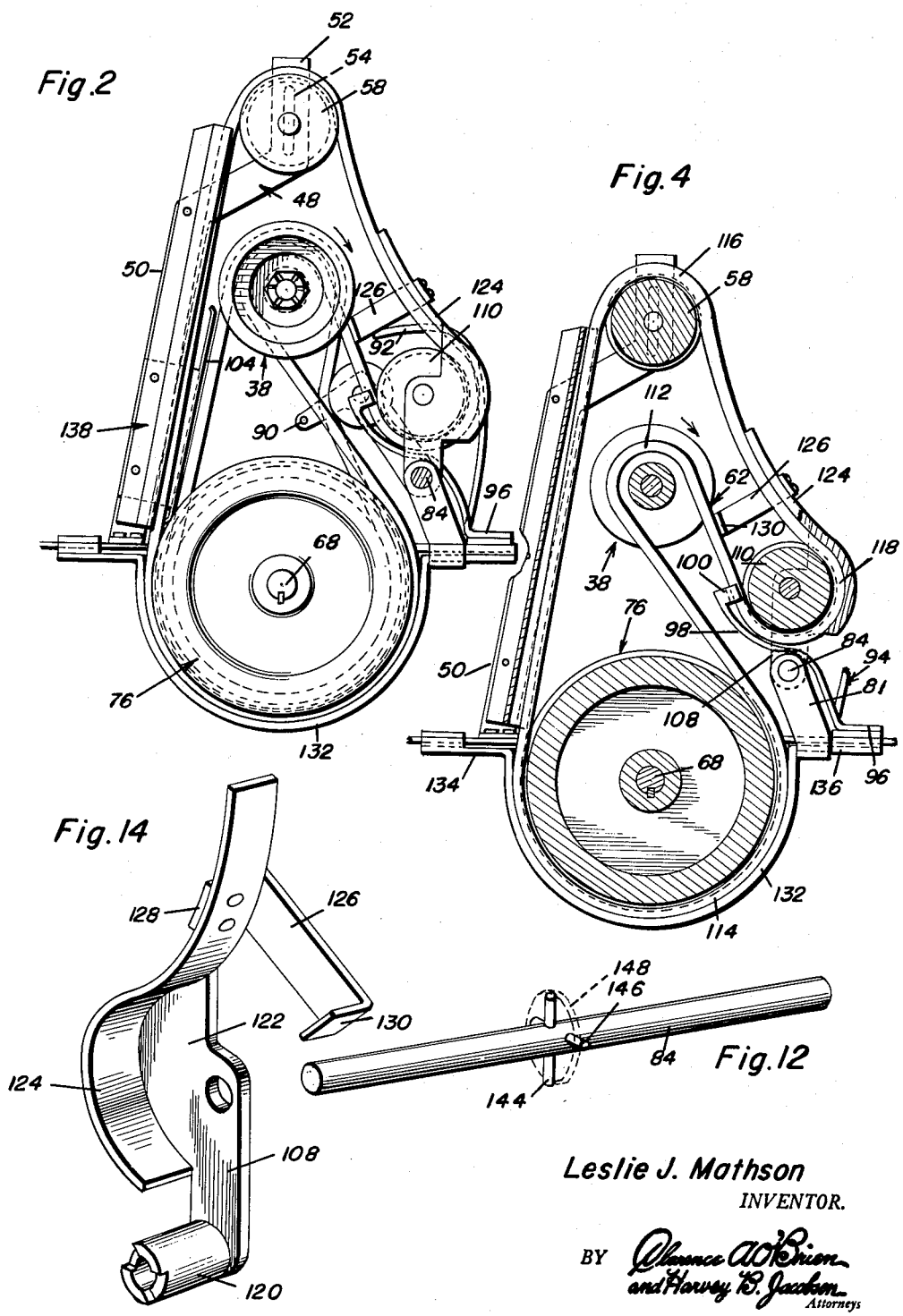

Sept. 20, 1955 L. J. MATHSON 2,718,154
TRANSMISSION
Filed May 4, 1953 4 Sheets-Sheet 3
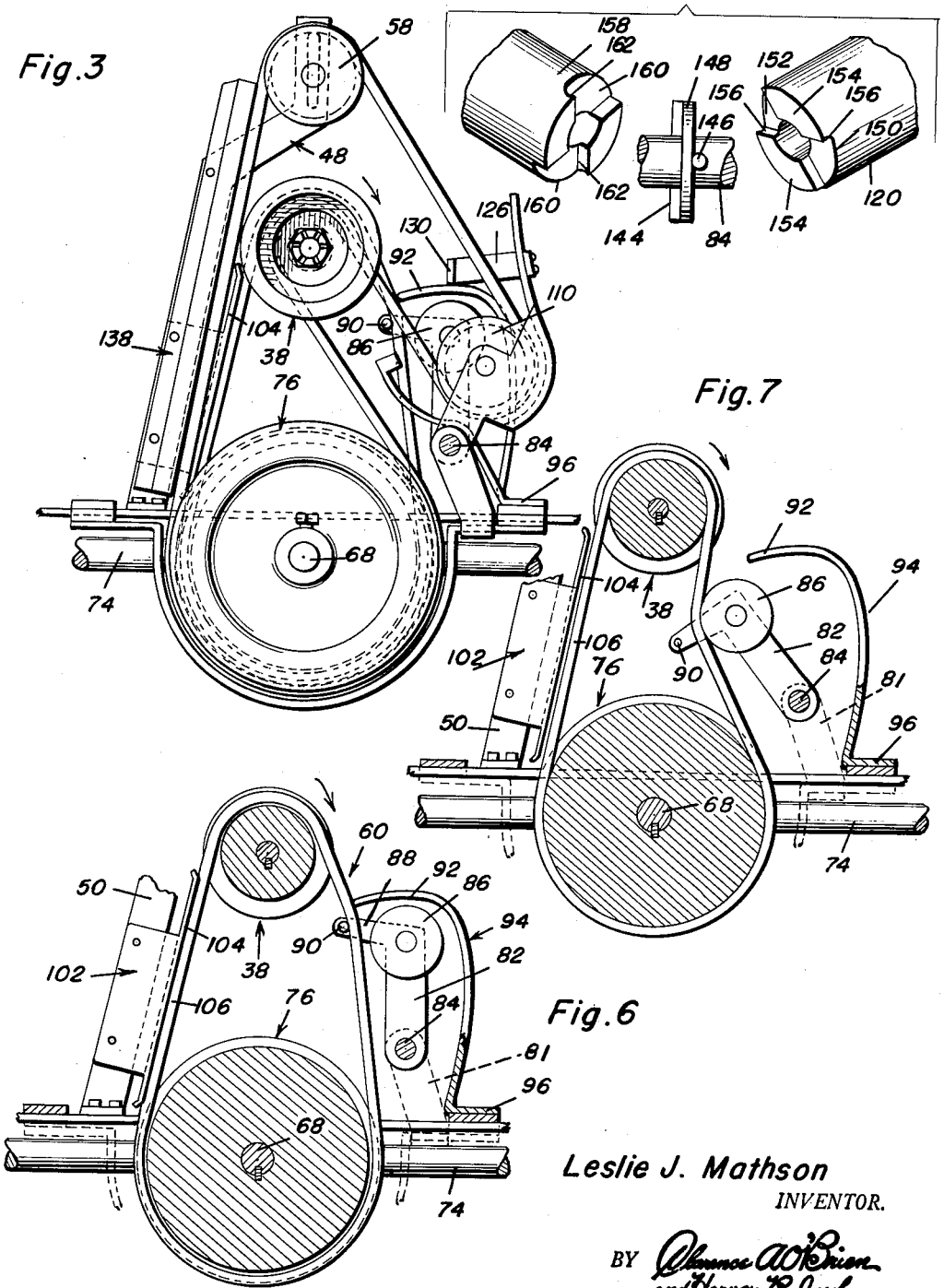
Leslie J. Mathson
INVENTOR.

Sept. 20, 1955      L. J. MATHSON      2,718,154
TRANSMISSION
Filed May 4, 1953      4 Sheets-Sheet 4
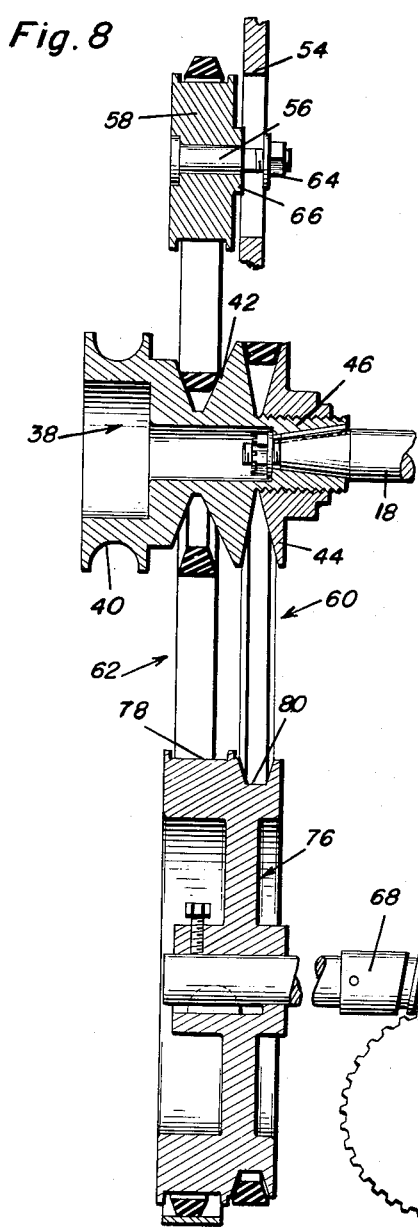
Fig. 8
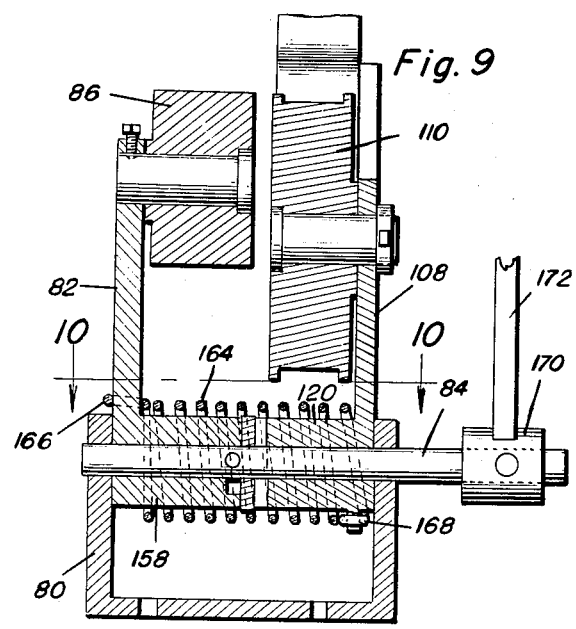
Fig. 9
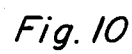
Fig. 10
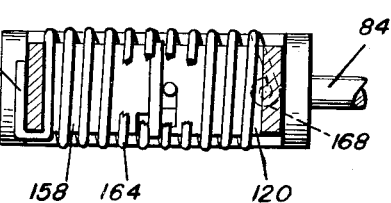
Fig. 13
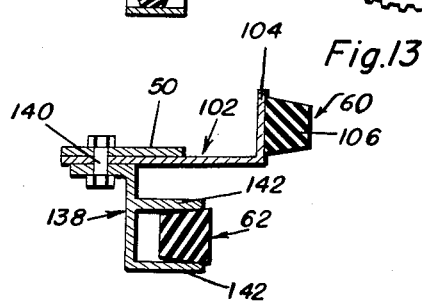
Leslie J. Mathson
INVENTOR.
BY *Clarence A. O'Brien*
*and Harvey B. Jacobson*
Attorneys

United States Patent Office 2,718,154
Patented Sept. 20, 1955

2,718,154

TRANSMISSION

Leslie J. Mathson, Hales Corners, Wis.

Application May 4, 1953, Serial No. 352,950

10 Claims. (Cl. 74—220)

This invention relates generally to transmission mechanisms and pertains more particularly to a belt gearing for effecting forward and reverse movement of a wheeled vehicle.

A primary object of this invention is to provide an improved form of reversible drive vehicles, principally of the type such as utilized in garden tractors, lawn mowers, or the like.

Another object of this invention is to provide a reversible belt gearing mechanism which incorporates positive clutching and declutching means in both the forward and reverse drive assemblies.

Another object of this invention is to provide an improved form of belt gearing mechanism for garden tractors and the like which incorporates a pair of belt tightener means and associated belt braking means for both effectively establishing forward and reverse drives to the vehicle.

Another object of this invention is to provide a novel arrangement of belt and pulleys for effecting forward and reverse drives to a vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a rear elevational view of a lawn mower utilizing the novel belt gearing;

Figure 2 is an enlarged elevational view of the gearing assembly, showing the mechanism in the forward drive relationship;

Figure 3 is a view similar to Figure 2 but showing the assembly in the reverse drive position;

Figure 4 is a vertical section through the gearing assembly showing the reverse drive assembly;

Figure 5 is a view similar to Figure 4 but showing the mechanism in driving relation;

Figure 6 is an elevational section showing the forward drive assembly in inoperative position;

Figure 7 is a view similar to Figure 6 but showing the forward drive assembly in driving position;

Figure 8 is an enlarged vertical section taken substantially along the plane of section line 8—8 of Figure 1, showing the drive assembly arrangement on an enlarged scale;

Figure 9 is an enlarged vertical section taken through the belt tightener assembly as indicated by the section line 9—9 of Figure 1, showing this assembly on an enlarged scale;

Figure 10 is a horizontal section taken substantially along the plane of section line 10—10 of Figure 9, showing details of the tightener actuating means;

Figure 11 is an enlarged exploded perspective view of the main portion of the actuating means shown in Figure 10;

Figure 12 is an enlarged perspective view of the belt tightener actuating shaft;

Figure 13 is a transverse sectional view taken substantially along the plane of section line 13—13 of Figure 1, showing a portion of the belt guide and braking means on an enlarged scale;

Figure 14 is an enlarged perspective view of the belt guide and braking means incorporated in the reversed tightener assembly;

Figure 15 is an enlarged perspective view of the stationary view of the brake elements;

Figure 16 is an elevational view of a section of the handle bar portion of the vehicle showing the handle bars in two positions of use; and Figure 17 is an enlarged longitudinal section taken through the handle assembly.

Referring now more particularly to Figure 1, reference numeral 10 indicates generally the frame portion of the garden tractor or mower vehicle which is provided with driven wheels 12 at its rearward portion and idler wheels 14 at its front portion and the assembly may include mowing attachments (not shown) or other similar mechanisms, as desired. The vehicle incororates a power plant 16 suitably mounted on the frame delivering power to a power or drive shaft 18. The vehicle also incorporates a steering assembly in the form of a pair of angularly, upwardly extending hand grip shanks 22 interconnected at their upper ends by a cross bar 24 to which a throttle control 26 is fastened. The upper ends of the shanks 22 are provided with reversible hand grip assemblies 28 which include pilot shafts 30 rigidly secured thereto as by the rivet 32, these pilot shafts being projectible within the shanks 22. The upper ends of the shanks 22 are split as indicated by the reference character 34 and are provided with releasable clamp collars 36 that may be loosened to allow the hand grip assemblies to be rotated to any desired position with respect to the shanks such as that indicated by dotted lines in Figure 16.

Referring now more particularly to Figure 8, it will be seen that a drive and starter pulley assembly 38 is suitably secured to the power or drive shaft 18, this assembly includes a starter pulley 40 of well known construction, a drive pulley portion 42, and an adjustable forward pulley portion which includes an adjustable sheave 44 threadedly engaged on a hub portion 46 of the pulley assembly.

It is to be understood that the particular gear arrangement shown and hereinafter described may be either utilized as an attachment to existing power vehicle or may be incorporated as an integral unit of construction of the vehicle, and it will be further understood that the particular type of vehicle shown and described is not intended to be restrictive in any sense.

Referring now more particularly to Figures 5 and 8, it will be seen that a suitable bracket 48 is secured to the vehicle, this bracket includes a brake support portion 50 and an idler pulley bracket 52 which is provided with an elongated slot 54 for adjustably receiving a pulley idler shaft 56 of a reverse idler pulley 58. Adjusting the vertical height of the reverse idler pulley 58 will allow a reverse drive belt 62 to be maintained at the proper tension at all times. This adjustment is accomplished by loosening a nut 64 on a threaded end of the pulley shaft 56 which extends through the bracket and pulley and suitably positioning the pulley. An integral thrust collar 66 is provided on the pulley for proper bearing support of the idler pulley 58. A worm drive shaft 68, constituting a driven shaft, is provided with a worm portion 70 mating with a worm wheel 72 for driving an axle 74 which will have operably connected thereto the vehicle wheels, and this shaft is provided at its outer free end with a pulley arrangement 76 suitably keyed thereon. This pulley includes a reverse drive belt portion 78 and a forward drive belt portion 80, constituting coaxial pulleys, the former of which is provided in the manner of an annular groove inasmuch as the wider portion of the V-shaped reverse belt 62 engages this peripheral portion of the pulley, that is, the reverse belt is turned inside out, the arrangement on the reverse idler pulley 58 being identical. This results inasmuch as it is desired that the portion of the reverse belt that engages with the drive pulley portion 42 be conventionally engaged therewith.

Referring now more particularly to Figures 6 and 7, wherein the forward drive assembly is shown, it will be seen that a bracket ear 81 pivotally carries an L-shaped idler lever 82 by means of an actuator shaft 84, so that the lever 82 is adjustable between the two positions shown in a manner hereinafter described. The upper end of the main portion of this lever is provided with a rotatable belt tightener roller 86 engageable with a drive belt 60 to tighten the same with respect to the driving and driven pulley assemblies 38 and 76 respectively in the manner shown in Figure 7. The free end of a leg portion 88 of the tightener lever 82 is provided with a pin 90 disposed in spaced relation to the idler 86 and disposed on the opposite side of the belt 60 therefrom so that when the idler assembly is positioned in the manner shown in Figure 6, this pin or finger 90 will effect a clamping of the belt between this pin and a brake finger 92 which forms a portion of a brake assembly 94 rigidly secured to the vehicle through the medium of a flange portion 96.

Referring now more particularly to Figure 15, it will be seen that this brake assembly 94 incorporates, in addition to the brake finger 92, an offset reverse drive clamping brake 98 which incorporates belt grasping ears 100 for a purpose presently apparent.

With reference once more to Figures 6 and 7, it will be seen that the previously described brake bracket portion 50 provides a support for an L-shaped guide member 102 which includes a lateral leg 104 disposed substantially parallel to a flight portion 106 of the forward drive belt 60 in the manner shown. When the belt tightener is in the position shown in Figure 7, the belt will be pulled away from the portion 104 to prevent friction of the drive belt thereagainst and free movement of the same in driving the pulley assembly 76. However, when the belt tightener is in the braking or neutral position, shown in Figure 6, the portion 106 of the belt 60 will be slack and will have a tendency to bear against the guide portion 104. This is extremely important inasmuch as the guide assembly taken in conjunction with the previously described brake assembly will tend to prevent bowing of the drive belt which might accidentally establish a drive to the pulley assembly 76 from the assembly 38, which drive would be more in the nature of a drag.

Referring now more particularly to Figures 4 and 5, wherein the reverse drive assembly is shown, it will be seen that the previously described bracket portion 81 and associated actuating shaft 84 also pivotally carry an idler lever 108 to which is suitably journalled an idler roller 110 for tightening the reverse drive belt 62 in a manner hereinafter set forth. In regard to the disposition of the reverse drive belt with respect to the various pulley arrangements shown, it will be seen that the reverse drive belt is provided with a first looped portion 112 engaged about the drive pulley assembly 38, a second looped portion 114 trained about the driven pulley assembly 76, a third looped portion 116 trained about the idler pulley 58 and a fourth looped portion 118 trained about the belt tightener pulley 110. In this respect, it will be noted that the engagement between the portion 112 and the drive pulley 38 is conventional in nature inasmuch as the V section of the belt is engaged in a normal manner with this pulley, and the back or what would normally be referred to as the outside portion of the belt engages the peripheral portions of the various pulleys 76, 58, and 110.

Referring now more particularly to Figure 14, as well as Figures 4 and 5, it will be seen that the tightener lever 108 is provided with a hub portion 120 receiving the actuator shaft 84 in a manner hereinafter set forth, and this lever is also provided with an enlarged upper portion 122, provided with a lateral flange 124 which is generally S-shaped in configuration as shown. The upper portion of this flange has a U-shaped guide member 126 secured thereto by its leg portion 128 while its opposite leg portion 130 is spaced therefrom and is adapted to be rotated with the lever into and out of engagement with the belt 62. When the assembly is in the neutral position shown in Figure 4, the tightener pulley 110 will cooperate with the previously described belt grasping ears or braking fingers 100 to clamp the reverse drive belt therebetween. At the same time, the S-shaped flange 124 will properly guide the reverse drive belt with respect to the tightener pulley 110 to prevent its falling away from this pulley to effect a driving engagement of the belt with either of the pulleys 38 or 76, whereas the finger portion 130 engages the portion of the belt between the drive pulley 38 and the tightener 110 to prevent the bowing out of this portion of the belt which might tend to establish a driving relationship between the belt and the pulley 38. At the same time, an arcuate guide plate 132 is secured by laterally offset opposite ends 134 and 136 to the vehicle, passing beneath the driven pulley assembly 76 and preventing downward motion of the corresponding portion of the drive belt which might tend to tighten the section of the belt between the pulleys 38 and 76 to effect a drive thereto. As seen in Figure 13 the previously mentioned brake bracket 50 carries a brake assembly 138 by means of a suitable fastening means 140 which also secures the brake or guide 102 to the bracket portion 50, and it will be seen that the brake assembly 138 is provided with spaced lateral legs 142 which engage on opposite sides of the belt 62 to complete the guiding and braking constraint on the reverse drive belt to properly maintain the same in non-driving relationship to either of the pulley assemblies 38 or 78. With the belt tightener pulley 110 in the position shown in Figure 5, the guide flange 124 as well as the guide ear 130 will be swung with the pulley 110 out of engagement with their corresponding portions of the drive belt while at the same time the tensioning of the belt due to the engagement of the pulley 110 thereagainst in the direction shown will also disestablish frictional contact between the lower portion 114 of the belt and the guide plate 132 as well as disestablishing engagement between the belt and the brake assembly 138.

Referring now more particularly to Figures 9-11, it will be seen that the previously mentioned actuating shaft 84 is provided at an intermediate portion with the longitudinally spaced and right angularly disposed cross-pins 144 and 146 including a thrust washer 148 therebetween, and it will further be seen that the previously mentioned hub portion 120 of the reverse tightener assembly is pivotally received on this shaft and that the end portion of the hub is provided with a diametrically opposed tapering slot arrangement 150 and 152 leaving the end projections 154 to engage against the thrust washer 148 so that the pin 146 is disposed within the notches or slots 150 and 152. The normal position between the cross-pin 146 and the slots being that the cross-pin 146 engages against surfaces 156 of the slots when this tightener is in the neutral position.

In a corresponding manner, the forward drive belt tightening mechanism is provided with a hub portion 158, having end slots 160 provided with surfaces 162 with which the cross-pin 144 is normally engaged when this tightener is in the neutral position. To maintain both tighteners in the neutral position, a torsion coil spring 164 is disposed concentrically of the hub portions 120 and 158 and the spring is provided with opposite end portions 166 and 168 engageable with respective tightener assemblies to maintain them in this neutral position.

Referring now more particularly to Figures 1 and 9, it will be seen that the free end of the actuator shaft 84 is provided with engagement with a collar 170 at the lower end of a shift lever 172 whose upper end is disposed adjacent the cross-shaft 24 and is maintained at an intermediate point thereon as indicated by the solid lines in Figure 1, in the neutral position. By moving the shift lever to the right and manually holding the same in that position, as indicated by the reference numeral 174, a reverse drive will be effected to the gearing mechanism, it being appreciated that the disposition between the various cross-pins 146 and 144 and their corresponding slot is such that movement of the reverse belt tightener only will be effected by this movement of the shift lever. Movement of the shift lever to the left in Figure 1, to the position indicated by the reference character 176, will effect a forward drive to the vehicle while allowing the reversed belt tightener to be maintained in the neutral or brake position. Since the forward drive will normally be used throughout the operation of the machine, a retaining or locking member 178 is adjustably secured on the cross-shaft 24, the locking member being engageable with the shift lever to maintain it in the forward drive position.

It will be appreciated that the locking member 178 may be disposed at various positions on the cross bar 24 to effect the proper tension on the forward drive belt when the shift lever is engaged with the locking member.

It is to be noted that the provision of the belt transmission as described above, eliminates the necessity of all usual clutch mechanisms inasmuch as the transmission itself acts as a clutch to engage or disengage the drive from the power source in response to positioning of the shift lever.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A belt transmission comprising a drive shaft and a driven shaft spaced therefrom, a pair of coaxial pulleys connected to said drive shaft, a pair of coaxial pulleys connected to said driven shaft, a first belt trained over one of each said pairs of pulleys for driving the driven shaft in one direction, an idler shaft disposed in alignment with said drive and driven shafts, an idler pulley on said idler shaft, a second belt trained over the other of said pairs of pulleys and said idler pulley for driving said driven shaft in the reverse direction, a first belt tightener engageable with the first belt, a second belt tightener engageable with said second belt, plural brake means engageable with each of said belts in coordination with said tighteners, and means for actuating each of said tighteners and brake means to the exclusion of the other.

2. A belt transmission comprising a drive shaft and a driven shaft spaced therefrom, a pair of coaxial drive pulleys connected to said drive shaft, a pair of coaxial pulleys connected to said driven shaft, a belt trained over one of each said pairs of pulleys for rotating the driven shaft in one direction, an idler shaft disposed in alignment with said drive and driven shafts, an idler pulley on said idler shaft, a second belt trained over the other of said pairs of pulleys and said idler pulley for rotating the driven shaft in a reverse direction, a first belt tightener engageable with the first belt, a second belt tightener engageable with said second belt, plural brake means engageable with each of said belts in coordination with said tighteners, means for actuating each one of said tighteners and brake means to the exclusion of the other, said first tightener including a roller engageable with the first belt to tighten the same.

3. A belt transmission comprising a drive shaft and a driven shaft spaced therefrom, a pair of coaxial pulleys connected to said drive shaft, a pair of coaxial pulleys connected to said driven shaft, a first belt trained over one of each said pairs of pulleys for rotating the driven shaft in one direction, an idler shaft disposed in alignment with said drive and driven shafts, an idler pulley on said idler shaft, a second belt trained over the other of said pairs of pulleys and said idler pulley for rotating said driven shaft in a reverse direction, a first belt tightener engageable with the first belt, a second belt tightener engageable with said second belt, means for actuating each one of said tighteners to the exclusion of the other, said first tightener including a roller engageable with the first belt to tighten the same, and means engageable with said first belt for braking the same when the roller is out of engagement therewith, said last means including a pin spaced from said roller and movable therewith, said pin and roller being disposed on opposite sides of said first belt.

4. A belt transmission comprising a drive shaft and a driven shaft spaced therefrom, a pair of coaxial pulleys connected to said drive shaft, a pair of coaxial pulleys connected to said driven shaft, a first belt trained over one of each said pairs of pulleys for rotating the driven shaft in one direction, an idler shaft disposed in alignment with said drive and driven shafts, an idler pulley on said idler shaft, a second belt trained over the other of said pairs of pulleys and said idler pulley for rotating said driven shaft in a reverse direction, a first belt tightener engageable with the first belt, a second belt tightener engageable with said second belt, means for actuating each one of said tighteners to the exclusion of the other, said first tightener including a roller engageable with the first belt to tighten the same, and means engageable with said first belt for braking the same when the roller is out of engagement therewith, said last means constituting a pin carried with said roller and a brake finger, said pin and said roller being disposed on opposite sides of said first belt, and said finger being positioned so that said pin urges the belt thereagainst when the roller is out of engagement with the belt.

5. A belt transmission comprising a drive shaft and a driven shaft spaced therefrom, a pair of coaxial drive pulleys connected to said drive shaft, a pair of coaxial pulleys connected to said driven shaft, a belt trained over one of each said pairs of pulleys for rotating the driven shaft in one direction, an idler shaft disposed in alignment with said drive and driven shafts, an idler pulley on said idler shaft, a second belt trained over the other of said pairs of pulleys and said idler pulley for rotating the driven shaft in a reverse direction, a first belt tightener engageable with the first belt, a second belt tightener engageable with said second belt, means for actuating each one of said tighteners to the exclusion of the other, said second tightener including an idler roller about which said second belt is trained, said roller being movable between a neutral and a belt tightening position, and means for braking said second belt when the tightener is in the neutral position.

6. The combination of claim 5 wherein said last means includes a brake member adjacent said second belt, said second belt being clamped between said brake member and said idler roller when the latter is in the neutral position.

7. A belt transmission comprising a drive shaft and a driven shaft spaced therefrom, a pair of coaxial pulleys connected to said drive shaft, a pair of coaxial pulleys connected to said driven shaft, a first belt trained over one of each said pairs of pulleys for rotating the driven shaft in one direction, means operably connected to each of the other pulleys for imparting a reverse drive to said driven shaft through the other of said pulleys, a belt tightener, said tightener being movable and having a roller engageable with the belt, said tightener also having a belt engaging pin spaced from said roller, and a stationary brake finger adjacent said belt, said belt being clamped between said pin and said finger when the roller is out of engagement with the belt.

8. A belt transmission comprising a drive shaft and a driven shaft spaced therefrom, a pair of coaxial pulleys connected to said drive shaft, a pair of coaxial pulleys connected to said driven shaft, a first belt trained over one of each said pairs of pulleys for rotating the driven shaft in one direction, means operably connected to each of the other pulleys for imparting a reverse drive to said driven shaft through the other of said pulleys, a belt tightener, said tightener being movable and having a roller engageable with the belt, said tightener also having a belt engaging pin spaced from said roller, and a stationary brake finger adjacent said belt, said belt being clamped between said pin and said finger when the roller is out of engagement with the belt, a belt guide adjacent that portion of the belt opposite said tightener and engageable therewith for preventing bowing of said belt when the roller is out of engagement with the belt.

9. A belt transmission comprising a drive shaft and a driven shaft spaced therefrom, a pair of coaxial pulleys connected to said drive shaft, a pair of coaxial pulleys connected to said driven shaft, an idler shaft disposed in alignment with said drive and driven shafts such that all the shaft centers lie in a straight line, an idler pulley on said idler shaft, a belt trained over one of each said pairs of pulleys and said idler pulley for rotating the driven shaft in one direction, means for imparting reverse rotation to said driven shaft through the other of said pulleys, a belt tightener including a movable roller engageable with said belt, a stationary brake member adjacent said belt, said belt being clamped between said brake member and said roller when the latter is in a neutral position.

10. A belt transmission comprising a drive shaft and a driven shaft spaced therefrom, a pair of coaxial pulleys connected to said drive shaft, a pair of coaxial pulleys connected to said driven shaft, an idler shaft disposed in alignment with said drive and driven shafts such that all the shaft centers lie in a straight line, an idler pulley on said idler shaft, a belt trained over one of each said pairs of pulleys and said idler pulley for rotating the driven shaft in one direction, means for imparting reverse rotation to said driven shaft through the other of said pulleys, a belt tightener including a movable roller engageable with said belt, a stationary brake member adjacent said belt, said belt being clamped between said brake member and said roller when the latter is in a neutral position, a secondary belt brake engageable with that portion of the belt opposite said tightener when the roller is disposed in a neutral position.

References Cited in the file of this patent

UNITED STATES PATENTS

| | | |
|---|---|---|
| 404,002 | Heacock | May 28, 1889 |
| 1,160,537 | Siddal | Nov. 16, 1915 |
| 2,306,755 | Ronning | Dec. 29, 1942 |
| 2,556,939 | Povinelli | June 12, 1951 |